Oct. 7, 1958            D. B. MARTIN            2,855,512
ELECTRONIC WELDING CONTROL
Filed Jan. 19, 1955
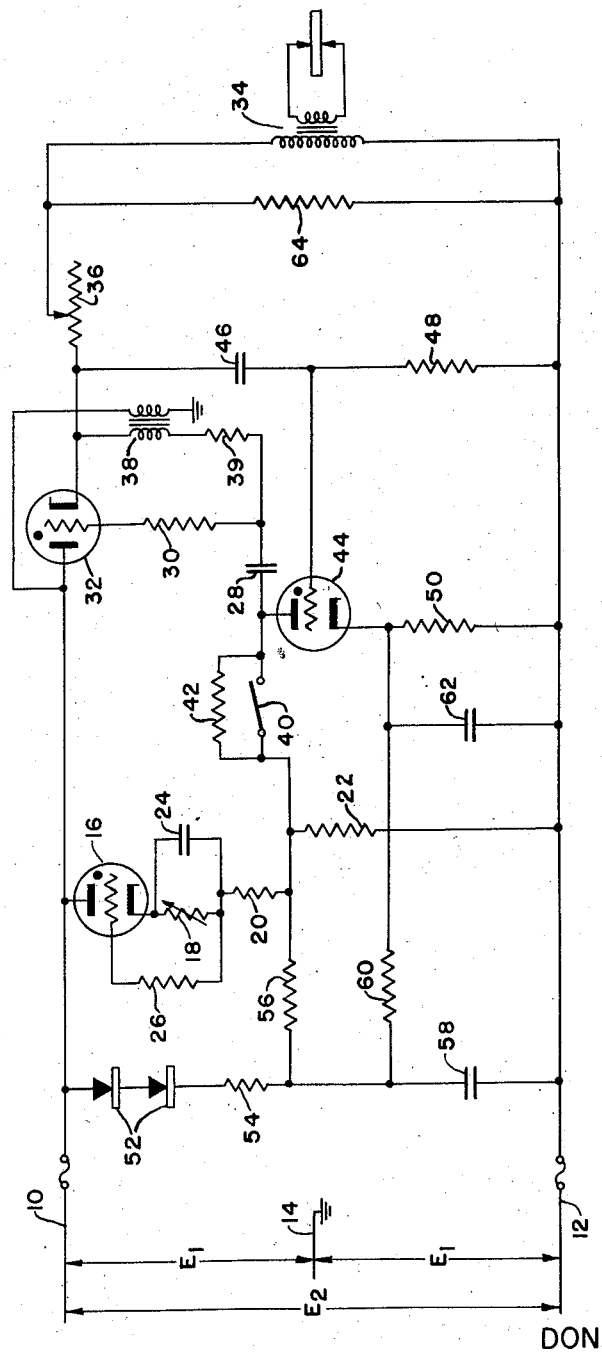
INVENTOR
DONALD B. MARTIN
BY *Michael Hertz*,
ATTORNEY United States Patent Office 2,855,512
Patented Oct. 7, 1958

2,855,512

ELECTRONIC WELDING CONTROL

Donald B. Martin, Huntington, W. Va., assignor to Sylvania Electric Products Inc., a corporation of Massachusetts Application January 19, 1955, Serial No. 482,723

6 Claims. (Cl. 250—27)

This invention relates to timing mechanism and in particular to timing mechanism adapted to electric welding utilizing alternating current.

It is an object of this invention to simplify the construction of such timing mechanism by utilizing few parts and simple circuitry.

It is a further object of the invention to create a timing mechanism which shall be economical to build and operate and be reliable in operation.

It is a still further object of the invention to provide a control which shall provide for starting a welding cycle each time a switch is operated at the same point of a positive half cycle of an alternating current supply and provide for ending of the welding operation at the same point toward the end of the half cycle, regardless of the starting switch remaining closed.

These and other objects will be apparent after reading the following specification and claims in conjunction with the accompanying drawing in which the figure is a circuit diagram of a novel timer embodying the invention.

In said drawing there is disclosed a three wire A.-C. line, the outside wires being indicated as 10 and 12 and across which there is a nominal 220 volts and the neutral grounded wire being indicated as 14. Between wire 14 and either of the outside wires there is a nominal 110 volts.

Bridging the wires 10 and 12, in series relation, is a gas filled triode 16, a variable resistor 18, a second circuit limiting resistor 20 and a third resistor 22. The resistor 18 is paralleled by a condenser 24. Grid bias for the tube is obtained by connecting a resistor 26 between the grid of the tube and the lower end of resistor 18. The tube will conduct when the A.-C. voltage on the line rises high enough on the positive half cycle to ionize the gas within the tube. After several cycles the condenser 24 will be charged to a low value and the voltage across this condenser will establish a bias on the cathode to delay the firing of the tube until a desired point on the positive cycle of the A.-C. supply is reached. This bias may be adjusted so as to vary the time of firing of the tube 16 by varying the resistor 18. After the bias is established, the tube 16 will always be conductive for the same portion of the positive swing of the supply line voltage, being extinguished with each reversal of voltage flow through the tube 16 and resistors 18, 20, and 22. The current flow produces a potential difference across the resistor 22, the voltage curve across the resistor following the voltage curve across the tube. Since at firing potential on the grid of the tube, the tube becomes instantly conductive, the voltage curve across the resistor 22 is characterized by a sharp rise. This sudden rise in voltage or positive pulse is applied to a condenser 28 connected via a grid resistor 30 to the grid of a gas filled tube 32 of large current capacity. This high current capacity tube is in the wire 10 and in series with the high voltage winding of a welding transformer 34, via a current controlling variable resistor 36. The resistance 20 and the variable resistor 18 control the current flow through the tube 16 to the condenser 28. The grid of tube 32 is biased to swing negative as the anode goes positive by providing a transformer 38, the primary of which is connected between line 10 and ground of the supply, and the secondary of which is connected between cathode and grid of the tube 32 via a current limiting resistor 39 and grid bias resistor 30. The windings of the transformer are so related that the grid and plate swing in opposite phases. This prevents firing of the tube except under control of the pulses derived from the tube 16. Pulses from the tube 16 are led to the condenser 28 via a switch 40. To prevent inadvertent firing of the tube 32 on closure of the switch solely because of surge phenomena, a high resistance 42 bridges the switch. Upon closure of the switch, full potential, as it quickly rises across resistance 22, is applied to the condenser 28 and to the grid of tube 32.

In accordance with the invention, the conduction of tube 32 is limited to one positive half cycle of the supply voltage regardless of whether the switch 40 is maintained closed or not after the occurrence of one positive half cycle.

To accomplish this result there is employed a network involving a third gas filled triode 44. When tube 32 fires, a burst of current flows through tube 32 and a positive pulse appears at the junction point between a condenser 46 and resistor 48, these being series connected across the line 10, 12, causing the grid of tube 44 connected to this point to become instantaneously positive, and allowing that tube to fire. The tube 44 is interposed between the cathode of tube 16 and the wire 12 and it functions, when fired, to short out the pulses to the grid of tube 32. These pulses flow through tube 16 on every positive half cycle of the A.-C. supply and except for the shorting out of the same by the tube 44 they would be applied to the grid of tube 32 every other half cycle of the A.-C. supply. The difference in potential between grid and cathode of tube 44 necessary to fire the tube is obtained by the resistors 48 and 50. The anode of tube 44 is connected to the wire leading to the grid of tube 32 at a point between the switch 40 and the condenser 28. The tube 44 is furnished with direct current by providing the rectifiers 52, the current through the rectifiers flowing through the resistors 54, 56, and switch 40 to the anode of tube 44. To maintain the tube 44 in operation after being fired, a large condenser 58 is provided, which together with the resistors 54 and 56 filters the current flowing to the tube. The cathode tube 44 is clamped at a desired positive potential by application of positive voltage thereto through the resistor 60, the voltage being steadied by filter condenser 62. The resistors 54, 56 and 50 limit the current flow through the tube 44 to a safe value. A resistor 64 bridges the primary of the welding transformer to damp out inductive kick from the transformer and to provide a discharge path for the condenser 46.

On opening of the switch 40, the current through the tube 44 is interrupted and the circuit is now reestablished for another cycle of operation initiated by closure of the switch 40.

As an aid in the construction of a workable timer, the following list of parts is given. The types of tubes employed and the values of resistors and condensers given should not be considered as limitative in any way since the claims themselves define the meets and boundaries of the invention.

Transformer 34—conventional 230 volt primary and welding transformer.
Transformer 38—118 volt primary, 24 volt secondary.
Tubes 16, 44—2050.
Tube 32—FG 27.

Selenium rectifiers (2)—NC5.
Potentiometer 18—2K ohms.
Potentiometer 36—20 ohms.

Resistors:

| | | |
|---|---|---|
| 20 | ohms | 5K |
| 22 | do | 20K |
| 26, 39, 48, 60 | do | 10K |
| 30 | do | 50K |
| 42 | megohms | 0.5 |
| 50 | ohms | 500 |
| 54 | do | 500K |
| 56 | do | 30K |
| 64 | do | 1K |

Condensers:

| | | |
|---|---|---|
| 24, 62 | µf | 10 |
| 28 | µf | .0005 |
| 46 | µf | .005 |
| 58 | µf | 8 |

Having thus described my invention, what I claim as new is:

1. A cycle timer comprising a first gas filled tube having a cathode, a first resistor in series with the cathode, both said tube and resistor being across an A.-C. line, a second, grid controlled, gas filled tube and a load, said second tube and load being in series with each other in said line, a grid resistor connected to the grid of said second tube, a switch connected at one end to the end of said first resistor nearest the cathode, the other end of the switch being connected to a line leading to the grid of the second tube, the cathode of the second tube being connected through the grid resistor to the grid, and a third, grid controlled, gas filled tube in parallel with the first resistor and connected at its anode to said switch line with its grid pulse-connected with the circuit of the second tube.

2. A cycle timer comprising a first gas filled tube having a cathode, a first resistor in series with the cathode, both said tube and resistor being across an A.-C. line, a second, grid controlled, gas filled tube and a load, said second tube and load being in series with each other in said line, a grid resistor connected to the grid of said second tube, a switch connected at one end to the end of said first resistor nearest the cathode, the other end of the switch being connected to a line leading to the grid of the second tube, the cathode of the second tube being connected through the grid resistor to the grid, self-biasing means for said second tube in said connection, and a third, grid controlled, gas filled tube in parallel with the first resistor and connected at its anode to said switch connected line with its grid pulse-connected with the circuit of the second tube.

3. A cycle timer comprising a first grid controlled gas filled tube, a variable self-biasing means in the cathode circuit of the tube for varying the potential on the cathode, a grid resistor between the self-biasing means and the grid of the tube, a second resistor connected to the non-cathode connected end of the biasing means, said tube biasing means and second resistor being in series arrangement and across an A.-C. line, a second, grid controlled, gas filled tube and a load in series with each other in said line, a grid resistor connected to the grid of said second tube, a switch for pulse connecting the self-biasing means connected end of said second resistor to the grid resistor of the second tube, the cathode of the second tube being connected through its grid resistor to the grid, and a third grid controlled gas filled tube shunting the second resistor and connected at its anode end between the grid resistor of the second tube and the switch with its grid pulse-connected with the circuit of the second tube.

4. A cycle timer comprising a first gas filled tube having a cathode, a first resistor in series with said cathode, both said tube and resistor being across an A.-C. line, a second, grid controlled, gas filled tube and a load in series therewith in said line, a grid resistor connected to the grid of said second tube, a switch under control of an operator for pulse connecting the cathode directed end of said first resistor to the grid of the second tube via its grid resistor, the cathode of the second tube being connected to the non-grid connected end of said grid resistor, a third, grid controlled, gas filled tube shunting the first resistor with the switch between the first resistor and the anode of the third tube, the grid of said third tube being pulse connected to the cathode of the second tube, and means for furnishing direct current to the anode of said third tube via said switch.

5. A cycle timer comprising a first gas filled tube, a first resistor in series with said cathode, both said tube and resistor being across an A.-C. line, a second, grid controlled, gas filled tube and a load in series therewith in said line, a grid resistor connected to the grid of said second tube, a switch under control of an operator for pulse connecting the cathode directed end of said first resistor to the grid of the second tube via its grid resistor, a resistor shunting said switch, a condenser between the switch and the grid resistor of the second tube, the cathode of the second tube being connected to the non-grid connected end of said grid resistor, a third, grid controlled, gas filled tube shunting the first resistor with the switch between the first resistor and the anode of the third tube, the grid of said third tube being pulse connected to the cathode of the second tube, and means for furnishing direct current to the anode of said third tube via said switch.

6. A cycle timer comprising a first gas filled tube, a first resistor in series therewith, both said tube and resistor being across an A.-C. line, a second, grid controlled, gas filled tube and a load in series with each other across said line, means under control of an operator for pulse connecting one end of said resistor to the grid of the second tube, means comprising a serially connected condenser and second resistor connected at one end to the line between the cathode of the second tube and the load and connected at the other end to the line beyond the load, and a third, grid controlled, gas filled tube shunting the first resistor, the grid of said third tube being connected to the common connection of the condenser and second resistor.

References Cited in the file of this patent

UNITED STATES PATENTS

| | | |
|---|---|---|
| 2,232,373 | Dorst | Feb. 18, 1941 |
| 2,465,355 | Cook | Mar. 29, 1949 |
| 2,491,413 | Lexa | Dec. 13, 1949 |
| 2,516,422 | Rockafellow | July 25, 1950 |